United States Patent [19]

Arisaka et al.

[11] 4,109,258
[45] Aug. 22, 1978

[54] SHUTTER FOR CAMERAS

[75] Inventors: Kunio Arisaka, Urawa; Hiroyuki Harada, Kawaguchi, both of Japan

[73] Assignee: Copal Company Limited

[21] Appl. No.: 760,425

[22] Filed: Jan. 18, 1977

[30] Foreign Application Priority Data

| Jan. 20, 1976 | [JP] | Japan | 51-5190 |
| Jan. 26, 1976 | [JP] | Japan | 51-7466[U] |
| Jan. 29, 1976 | [JP] | Japan | 51-9191[U] |

[51] Int. Cl.² .......................... G03B 7/08; G03B 9/08
[52] U.S. Cl. ...................................... 354/38; 354/230
[58] Field of Search ............... 354/129, 139, 149, 228, 354/230, 26, 27, 34, 36, 38, 40

[56] References Cited

U.S. PATENT DOCUMENTS

| 3,464,333 | 9/1969 | Aoki et al. | 354/34 |
| 3,643,562 | 2/1972 | Soichiro et al. | 354/34 |
| 3,750,552 | 8/1973 | Yazaki | 354/27 |
| 3,911,458 | 10/1975 | Imai et al. | 354/230 |

Primary Examiner—Donald Griffin
Attorney, Agent, or Firm—Cushman, Darby & Cushman

[57] ABSTRACT

A shutter for cameras comprising an intermediate lever to open and close shutter blades serving as diaphragm blades, a driving member which can open and close the shutter blades by rocking the intermediate lever while moving in one direction, a device which can vary the leverage of the intermediate lever by shifting the pivot of the intermediate lever with an EE mechanism and/or flashmatic mechanism and a synchroswitch operated by the driving member in order to make a flash-photographing possible at all shutter speeds.

9 Claims, 11 Drawing Figures

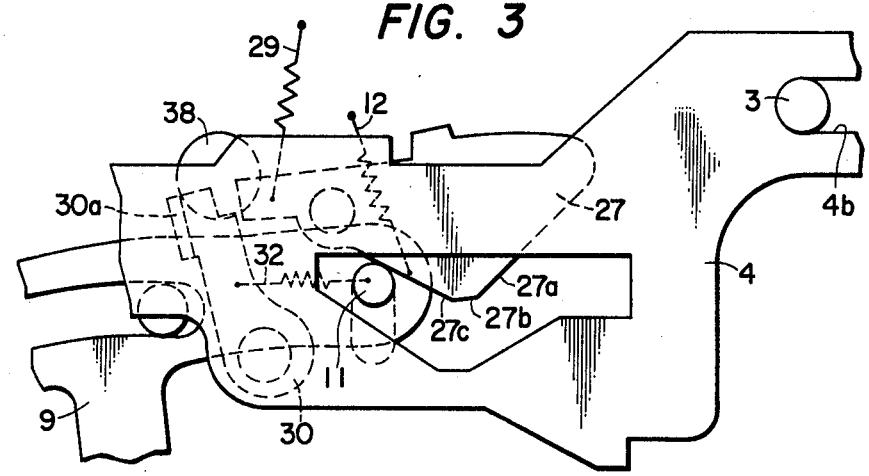
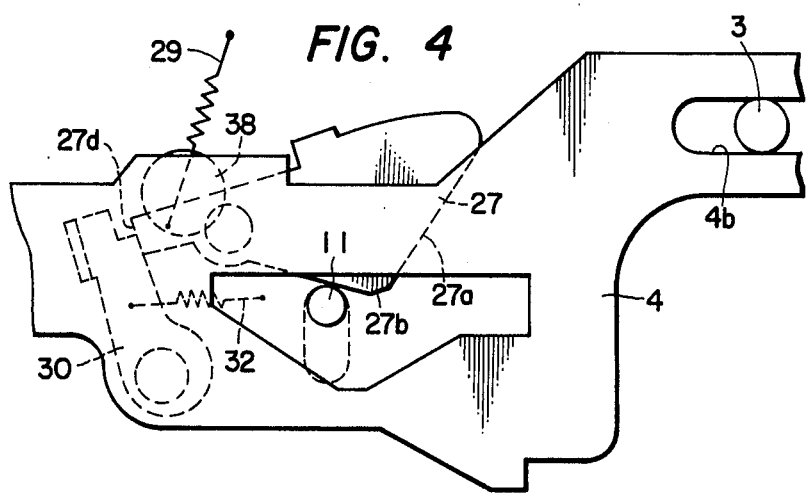
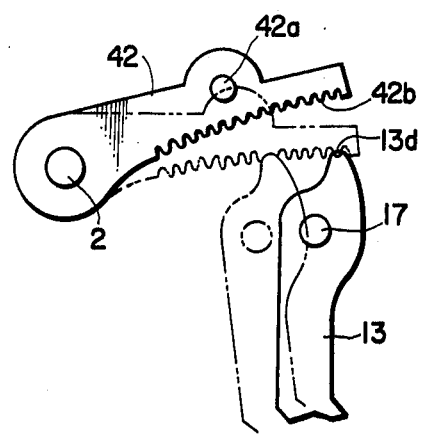

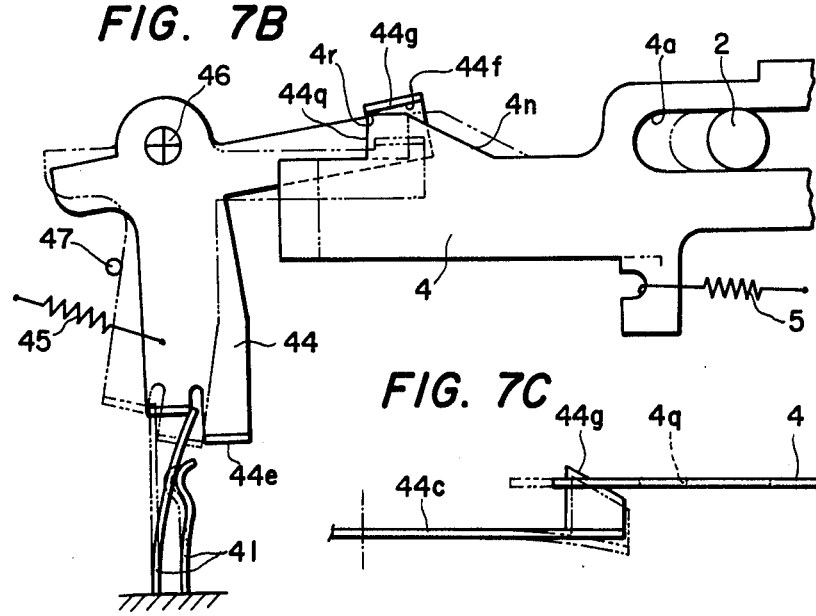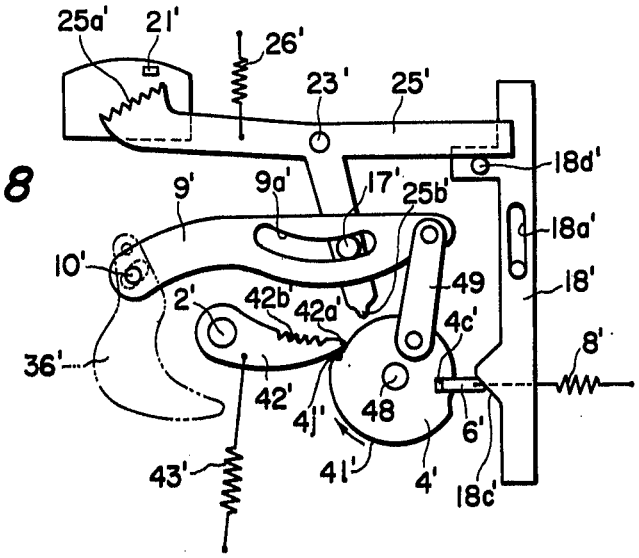

SHUTTER FOR CAMERAS

BACKGROUND OF THE INVENTION (a) Field of the Invention

This invention relates to shutters for photographic cameras and, more particularly, to a program type shutter whereby a flash-photographing is made possible at all shutter speeds.

(b) Description of the Prior Art

Generally, in a so-called program shutter wherein shutter blades are also diaphragm blades, the operated amount of the blades varies in each photographing in response to the brightness of an object to be photographed through an EE mechanism and the diaphragm aperture and shutter speed are simultaneously automatically set.

A conventional program shutter shall be briefly explained in the following. It is so arranged that, when a release button is first pushed, by its initial operation, a stopper position will be determined by the connection with an exposure meter having a CdS cell as a light receiving element, when the button is further pushed in, shutter blades will open at a constant speed, in case an object to be photographed is bright, by a present stopper, the shutter blades will close when they open slightly, for a dark object to be photographed, the stopper position will vary and the blades will fully open and then close and, even in an exposure intermediate between them, the combination of the diaphragm aperture and shutter speed will be determined continuously and steplessly.

In the case of making a flash-photographing by using such conventional program shutter as is described above, as described above, the operated amount of the shutter blades will vary each time in response to the brightness of the object to be photographed and therefore it will be difficult to directly operate a synchrocontact by the opening and closing operation of the shutter blades at all shutter speeds. In the case of making a flash photographing, unless the time of fully opening the shutter blades and the time when the flash light reaches the maximum brightness are made to coincide with each other, no efficient flash-photographing will be made. However, in the program shutter wherein the shutter blades are also diaphragm blades as described above, the time of starting the shutter blades is always fixed, the time of fully opening the shutter blades is different depending on the shutter speed to be controlled and therefore it is difficult to synchronize the time when the flash light reaches the maximum brightness with the time of fully opening the shutter blades at all shutter speeds.

Therefore, if the shutter speed is constant and only the diaphragm aperture is made variable, the above described defects will be anyhow eliminated. Therefore, it is generally practiced to adopt a so-called flashmatic system whereby, if the guide number of a flash bulb or strobobulb to be used is selected and the distance adjusting ring of the camera is operated, the shutter speed will be set and the diaphragm will vary as operatively connected with the movement of the distance adjusting ring. In such case, needless to say, the EE mechanism will not operate.

However, in the case of selecting the shutter speed to be of a specific value as described above, in consideration of the case of a general photographing, the shutter speed will not be able to be selected to be in a too high speed range and will be therefore usually set near 1/30 second. As a result, there are defects that the camera-shake will be likely to affect that, when an object moving at a high speed is photographed, the image will be likely to flow and that, when a figure at a window is photographed with a reverse light, the exposure will be excessive and a so-called daytime-synchrophotographing in which a flash light is utilized as an auxiliary light will not be made.

In order to make a daytime-synchrophotographing, it is necessary to make the EE mechanism work even at the time of a flash-photographing.

There have been conceived various methods of effectively working the EE mechanism not only at the time of a daytime-synchrophotographing but also at the time of a flash-photographing in the conventional program shutter. For example, there is a method wherein, as described above, the stopper for determining the operated amount of shutter blades is used as a synchrocontact. According to this method, when the shutter blades contact the stopper, they will begin to close and therefore the moment when they contact the stopper will be the time of fully opening the shutter blades. Therefore, if the synchrocontact is so made as to close when the blades contact the stopper, an efficient flash-photographing will be made.

However, in case such movable synchrocontact system as is described above is utilized, there will be such defects as are mentioned below. That is to say, as the synchrocontact moves, the arrangement will be complicated. As the contact time of the contact is instantaneous, the efficiency will be low. Further, due to the stagger or the like of the shutter blades, a discrepancy will be produced between the actual diaphragm aperture and the time when the flash is lighted by the synchroswitch and no favourable photographing will be made. Further, it can be used only as of an X-synchrocontact but can not be used as of an M-synchrocontact.

SUMMARY OF THE INVENTION

A primary object of the present invention is to provide a program type shutter for photographic cameras so arranged that a flash-photographing may be possible at all shutter speeds to be controlled while an EE mechanism is working.

Another object of the present invention is to provide a program type shutter for photographic cameras wherein the structure is comparatively simple and the operation is positive.

According to the present invention, the above mentioned objects are attained by providing an intermediate lever member operatively connected with shutter blades serving as diaphragm blades and having a shiftable pivot to determine the operated amount of the shutter blades and a driving member operatively connected with this intermediate lever member and capable of moving by a predetermined amount at a constant speed when released and arranging them so that the pivot of the intermediate lever member may be shifted by an EE mechanism and/or flashmatic mechanism and the shutter blades may be opened and closed through the intermediate lever member by the driving member while this driving member moves in one direction. The flash synchrocontact is operated as related with the movement of the driving member.

These and other objects of the present invention will become more apparent during the course of the following detailed description and appended claims.

BRIEF DESCRIPTION OF THE DRAWINGS

FIG. 3 is a partial plan view of the shutter in FIG. 1, showing the state after the end of the exposing operation;

FIG. 4 is the same partial plan view as of FIG. 3, showing the state of the shutter being cocked from the state in FIG. 3 to the state in FIG. 1;

FIG. 5 is a plan view showing another embodiment of a holding lever;

FIG. 7A is a partial view as seen along the arrow A in FIG. 7;

FIG. 7B is a plan view of the synchroswitch mechanism shown in FIG. 7 as operated;

FIG. 7C is the same partial view as of FIG. 7A, showing the state after the end of the operation; and FIG. 8 is a plan view showing another embodiment of a program shutter according to the present invention.

DESCRIPTION OF THE PREFERRED EMBODIMENTS

Figure 1:
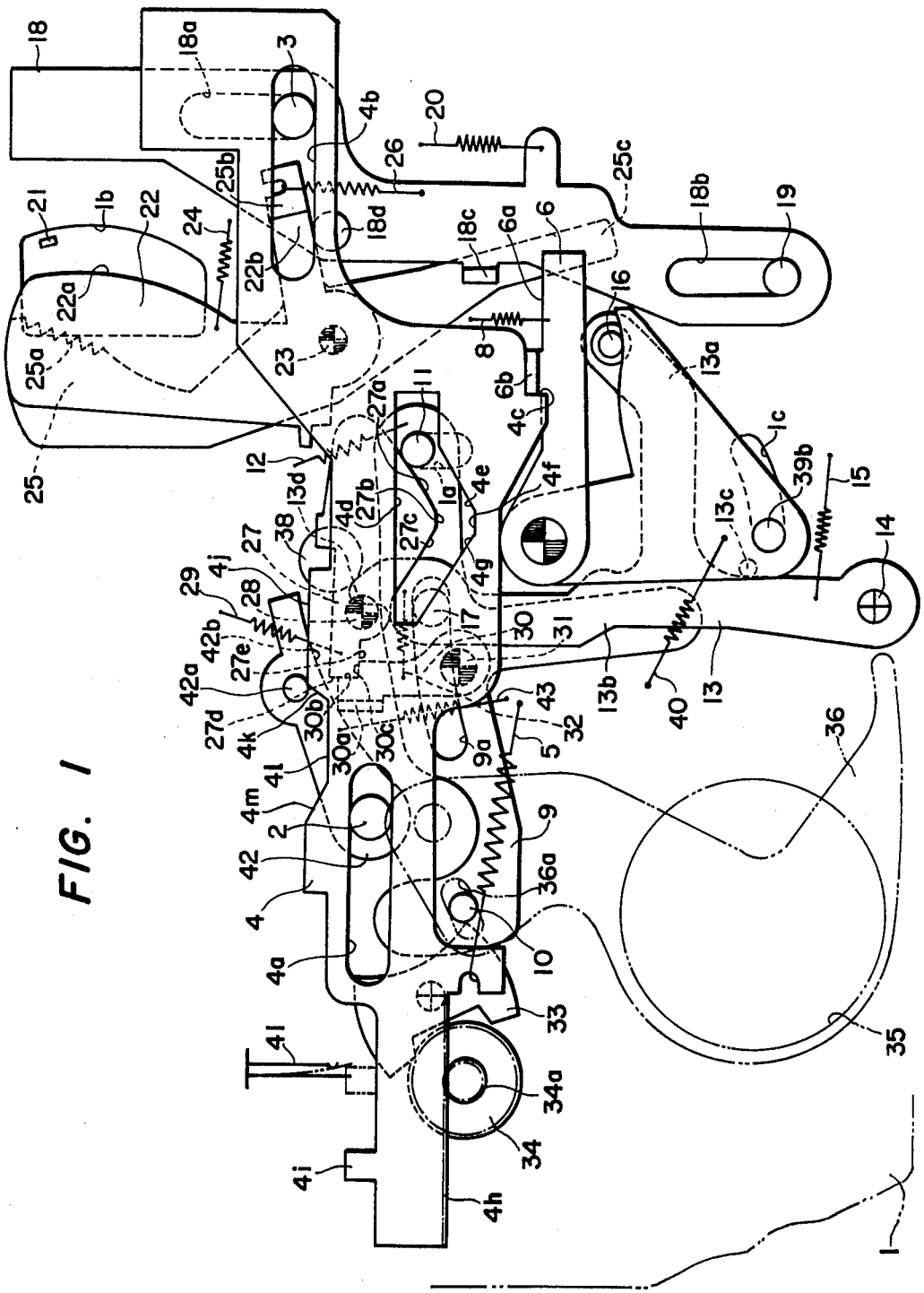
FIG. 1 is a plan view of a program shutter according to the present invention as cocked.
Figure 2:
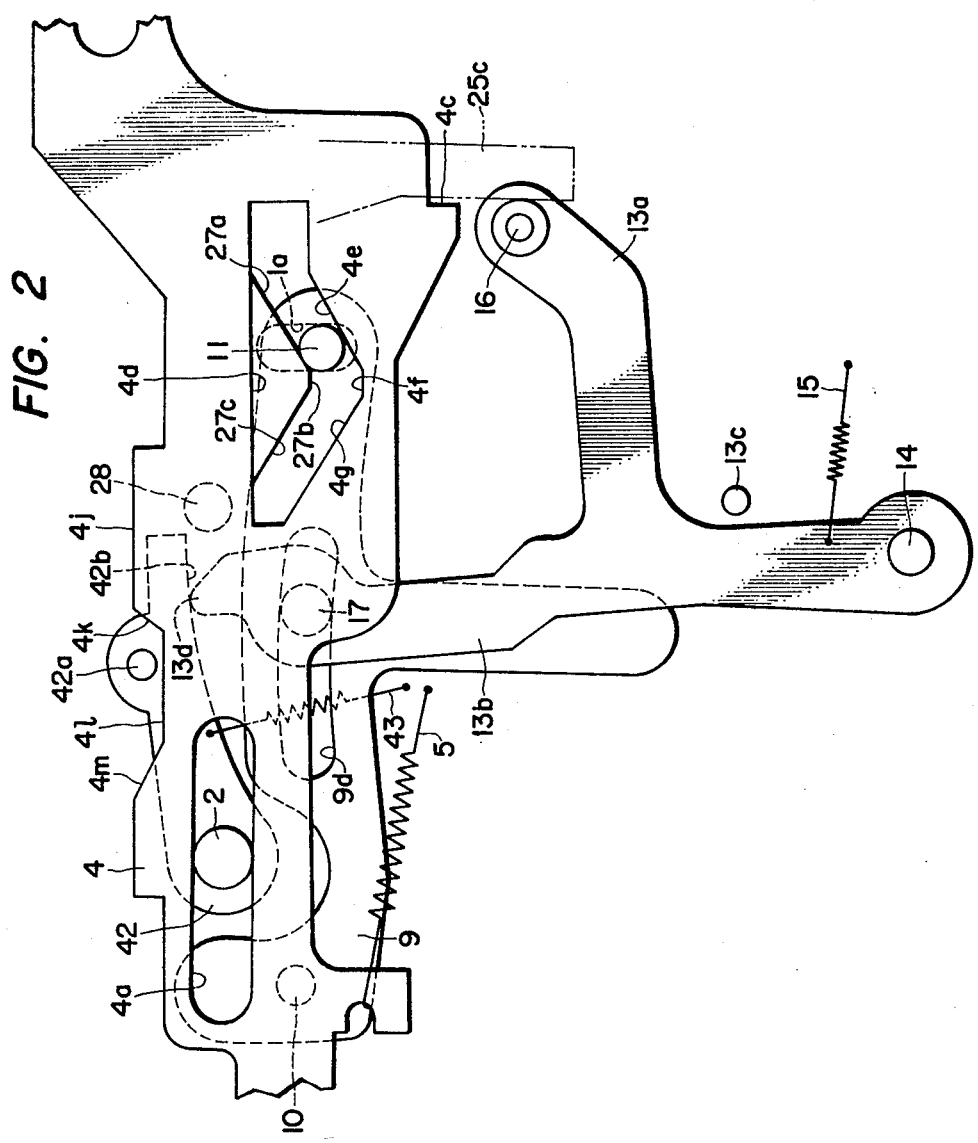
FIG. 2 is a partial plan view of the shutter in FIG. 1, showing the operating state immediately after the shutter release.

In FIGS. 1 to 4, reference numeral 1 indicates a shutter base plate on which slots 1a and 1c and a window 1b for an exposure meter pointer are formed and pins 2, 3 and 19 are erected. Reference numeral 4 indicates a driving plate on which long slots 4a and 4b, a hook portion 4c, an aperture 4d, a rack gear portion 4h, a projection 4i and cam-shaped sides 4j, 4k, 4l and 4m are formed. The long slots 4a and 4b are loosely fitted respectively to the pins 2 and 3 and are biased clockwise by a tension spring 5 but the hook portion 4c is locked by the bent portion 6b of a later described locking lever 6 so as to be held in the state in FIG. 1. The aperture 4d is particularly provided with cam surfaces 4e, 4f and 4g. The locking lever 6 forms a side 6a and the bent portion 6b toward the front side of the paper surface, is rotatably supported by a shaft 7 erected on the base plate 1 and is biased counterclockwise by a tension spring 8 but is controlled by the bent portion 6b in contact with one surface of the driving plate 4. Reference numeral 9 indicates an intermediate lever member having an arcuate long slot 9a formed substantially in the center and pins 10 and 11 erected respectively in both end portions. The pin 10 is loosely fitted in a slot 36a of a later described shutter blade 36 so as to serve to operatively connect the movement of the lever 9 with the blade 36. The pin 11 is erected through the intermediate lever, is loosely fitted in the lower portion in the guide slot 1a of the base plate 1 and is made to contact in the upper portion with a later described clutch pawl lever 27. The intermediate lever 9 is supported rotatably with a later described shaft 17 as a center and is biased counterclockwise by a tension spring 12 but is controlled by the pin 11 in contact with the end of the guide slot 1a. Reference numeral 13 indicates an EV-lever having arm portions 13a and 13b forked, supported rotatably by a shaft 14 erected on the base plate 1 and is biased clockwise by a tension spring 15 but its clockwise rotation is stopped by a pin 13c erected on the base plate 1. A stepped pin 16 is erected on the arm portion 13a of the EV-lever 13. The above mentioned shaft 17 is erected on the arm portion 13b. The shaft 17 is loosely fitted in the long slot 9a of the intermediate lever 9 and serves as a rotary shaft of the intermediate lever 9. Reference numeral 18 indicates a release member forming slots 18a and 18b, a bent portion 18c toward the front side of the paper surface and a pin 18d. The slots 18a and 18b are loosely fitted respectively with the pin 3 and 19 erected on the base plate 1. The release member 18 is biased upward by a tension spring 20 but its upward movement is stopped by the pins 3 and 19 in contact respectively with end portions of the slots 18a and 18b. Reference numeral 21 indicates a pointer of an exposure meter which is arcuately movable within the window 1b. Numeral 22 indicates a pointer pressing lever forming a clamper portion 22a, supported rotatably by a shaft 23 erected on the base plate 1 and biased clockwise by a tension spring 24 but controlled in the rotary motion by an arm portion 22b in contact with the pin 18d. Numeral 25 indicates a comb tooth portion 25a and arm portions 25b and 25c, supported rotatably by the shaft 23 and biased clockwise by a tension spring 26 but controlled in the rotary motion by the arm portion 25b in contact with the pin 18d. The tension spring 26 is connected at one end with the release member. The clutch pawl lever 27 forms cam surfaces 27a, 27b and 27c and locking surfaces 27d and 27e, is rotatably supported by a shaft 28 erected on the driving plate 4 and is biased clockwise by a tension spring 29 but is controlled in the rotary motion by the cam surface 27a in contact with the pin 11. The tension spring 29 moves at one end together with the driving plate 4 and is weaker than the tension spring 12. Reference numeral 30 indicates a judging lever forming a bent portion 30a toward the back side of the paper surface and locking surfaces 30b and 30c, supported rotatably by a shaft 31 erected on the driving plate 4 and biased clockwise by a tension spring 32 but controlled in the rotary motion by the clutch pawl lever 27. The tension spring 32 is to move at one end together with the driving plate 4. Reference numeral 33 indicates an anchor. Numeral 34 indicates an escapement formed integrally with a pinion 34a meshing with the rack gear portion 4h of the driving plate 4. Numeral 35 indicates an exposure aperture. Only one of two shutter blades 36 which are also diaphragm blades is shown. Reference numeral 38 indicates an unlocking pin erected on the base plate 1 and located within the operating range of the judging lever 30. Numeral 39 indicates a flashmatic lever forming an arm portion 39a and pin 39b, supported rotatably by the shaft 7 and biased clockwise by a tension spring 40 but controlled in the rotary motion by the pin 39b contacting the end of the escaping slot 1c. Further the pin 39b is connected with the distance adjusting ring of the camera not illustrated. Reference numeral 41 indicates an X-synchrocontact switch opened and closed by the projection 4i of the driving plate 4. Numeral 42 indicates a holding lever forming an arcuate side 42b, having a pin 42a engageable with the sides 4j, 4k, 4l and 4m of the driving plate 4 erected on it, supported rotatably by the pin 2 and biased clockwise by a tension spring 43 but controlled in the rotary motion by the pin 42a in contact with a corner formed by the sides 4j and 4k of the driving plate 4.

The operation of the above described shutter device shall be explained in the following.

FIG. 1 shows a cocked state. When the release member 18 is pushed down from this state, a known EE mechanism will work due to the initial operation of the release member 18. That is to say, by the release member 18, the comb tooth-shaped lever 25 will be rotated clockwise so that the arm portion 25c of the lever 25 will push the pin 16 of the EV-lever 13 to rotate the EV-lever 13 counterclockwise. When the EV-lever 13 rotates counterclockwise, the shaft 17 on the lever 13 will shift leftward within the long slot 9a of the intermediate lever 9 and will be stopped in a position so that the EV value of the program shutter will be set. This position will be determined by the rotated amount of the comb tooth-shaped lever 25 determined by the swung position of the pointer 21 of the exposure meter. When the release member 18 is further pushed down, the bent portion 18c will push the side 6a of the locking lever 6 to rotate the locking lever 6 clockwise. By this operation, the bent portion 6b of the locking lever 6 and the hook portion 4c of the driving plate 4 will be unlocked from each other and the driving plate 4 will begin to slide rightward at this time, the driving plate 4 will be moved at a comparatively low speed by a known governor device consisting of the rack gear portion 4h, anchor 33, escapement 34 and pinion 34a. When the driving plate 4 begins to move rightward, the pin 42a of the holding lever 42 will come to engage with the side 4k and the lever 42 will be rotated clockwise by the tension spring 43. When the pin 42a reaches a position of contact with the side 41, the arcuate side 42b of the lever 42 will contact the tip portion 13d of the EV-lever 13 and will thereafter hold the EV-lever 13 as fixed. The larger the tension of the tension spring 43, the stronger the holding force. When the driving plate 4 shifts rightward, the clutch pawl lever 27 will also shift together. By the rightward shift of the clutch pawl lever 27, the cam surface 27a will be pushed by the pin 11 of the intermediate lever 9, the clutch pawl lever 27 will tend to rotate counterclockwise but will not be able to rotate as it is locked by the judging lever 30 and the operating force to shift rightward will be transmitted to the pin 11 which will be shifted downward within the guide slot 1a of the base plate 1. By this operation of the pin 11, the intermediate lever 9 will be rotated clockwise around the shaft 17 to open the shutter blade 36 through the pin 10. When the driving plate 4 further shifts rightward and the cam surface 27b contacts the pin 11, the rotation of the intermediate lever 9 will stop and therefore the opening operation of the shutter blades 36 will also stop. This time is the fully opened time of the shutter. When the driving plate 4 further shifts rightward and the cam surface 27c contacts the pin 11, the pin 11 will begin to return upward, the intermediate lever 9 will rotate counterclockwise and the shutter blade 36 will begin to close. At a time point when the driving plate 4 continues to shift rightward, the bent portion 30a of the judging lever 30 will collide with the unlocking pin 38 and the judging lever 30 will be rotated counterclockwise to unlock the clutch pawl lever 27. At this time point, as mentioned above, the pin 11 will be in contact with the cam surface 27c and will be biased counterclockwise by the tension spring 12 through the intermediate lever 9 and further, as the spring 12 is stronger in the tension than the tension spring 29, the intermediate lever 9 will quickly rotate counterclockwise to close the shutter blade 36. After the shutter blade 36 closes, the driving plate 4 will be stopped by the contact of the ends of the long slots 4a and 4b respectively with the pins 2 and 3. When the pressing force is removed from the release member 18, the release member 18 will return to the illustrated position and the photographing will end.

During the above mentioned motion, as the pin 42a of the holding lever 42 is somewhat separated from the side 41 (See FIG. 2), the EV-lever 13 will continue to be held as fixed and, substantially simultaneously with the end of closing the shutter blade 36, the side 4m will come to engage with the pin 42a. Therefore, at this time point, the holding lever 42 will be rotated counterclockwise and the side 42b will separate from the tip 13d of the EV-lever 13 to make the EV-lever 13 free. Therefore, before cocking the shutter, the setting of the EV value by the later described flashmatic mechanism can be carried out without obstruction.

Here the operation of the EV-lever 13 shall be explained more particularly. The leverage of the intermediate lever 9 is determined by the position of the shaft 17 on the lever 13 within the long slot 9a of the intermediate lever 9 and the moved amount or operated distance of the pin 10 is different with a constant amount of the motion of the pin 11. Therefore, in case the object to be photographed is so dark that the pointer 21 of the exposure meter does not move so much, the rotated amount of the comb tooth-shaped lever 25 will be so small and the rotated amount of the EV-lever 13 will be also so small that the shaft 17 will be positioned near the right end of the long slot 9a and the pin 10 of the intermediate lever 9 will swing so much that a low speed exposure with a large diaphragm aperture will be obtained. On the contrary, in case the object to be photographed is bright, the pointer 21 will swing so much that a high speed exposure with a small diaphragm aperture will be obtained in the same manner.

Then the cocking operation of the above mentioned device shall be explained. The state after the end of the photographing is shown in FIG. 3. In this case, the bent portion 30a of the judging lever 30 is pushed by the unlocking pin 38 and is not engaged with the clutch pawl lever 27. When the driving plate 4 is moved leftward from this state, the clutch pawl lever 27 will shift together and will be rotated counterclockwise against the tension of the tension spring 29 by the pin 11. When the driving plate 4 is further moved until the pin 11 comes into contact with the cam surface 27b, the rotation of the lever 27 will stop. When the cam surface 27b passes the pin 11, the clutch pawl lever 27 will rotate clockwise while the cam surface 27a is in contact with the pin 11. When the driving plate 4 is further shifted leftward until the pin 11 is in the state shown in FIG. 1, due to the further clockwise rotation of the clutch pawl lever 27, the judging lever 30 will come to lock the clutch pawl lever 27. At this time, the driving plate 4 will be also locked by the bent portion 6b of the locking lever 6 and the cocking operation will completed. The cocking operation is completed as described above. However, as already made clear, during the cocking operation, the pin 11 will not operate in the vertical direction and therefore the shutter blades 36 will not open.

Now the flash-photographing operation shall be explained. When a flash-photographing switch not illustrated is switched on to prepare for the flash-photographing and the distance adjusting ring also not illustrated is operated by taking the photographing distance into consideration to operate the flashmatic lever 39, the lever 39 will rotate counterclockwise in response to the operated amount of the distance adjusting ring to rotate the EV-lever 13 counterclockwise and set a proper EV value for the distance of the object to be photographed in the same manner as is described above. When the shutter release member 18 is then pushed, the driving plate 4 will begin to shift rightward. When a present constant amount of motion is made, the x-synchrocontact switch 41 will be closed by the projection 4i provided on the driving plate 4 and a flash will be lighted. In the case of using the X-synchrocontact, this time point is the fully opened time of the shutter when the pin 11 is in contact with the cam surface 27b. Here the above described explanation is of the case of a flash-photographing at night or the like when the pointer 21 of the exposure meter does not move or, even if it moves, the comb tooth-shaped lever 25 will not come to push the EV-lever 13.

However, in the case of photographing a figure or the like in a reverse light, a daytime-synchrophotographing will be required. Therefore, such case shall be also explained. In the case of making a daytime-synchrophotographing, when the distance adjusting ring not illustrated is first operated to rotate the EV-lever 13 through the flashmatic lever 39 and set a proper EV value for the object to be photographed and the release member 18 is then pushed down, by the initial operation, the EE mechanism will work to measure the light amount of the background of the object and the comb tooth-shaped lever 25 will rotate to set a proper EV value. In such case, when the rotated amount of the lever 25 is so small that the arm portion 25c does not come into contact with the pin 16 of the EV-lever 13 already rotated by the flashmatic lever 39, the photographing carried out by later pushing down the release member 18 will be made with the EV value set by the flashmatic lever 39. But, in case the rotated amount of the comb tooth-shaped lever 25 is so large that the EV-lever 13 is further rotated counterclockwise, the photographing will be made with the EV value set by the comb tooth-shaped lever 25, that is, the EE mechanism. The flash light in this case will work as an auxiliary light.

Figure 6:
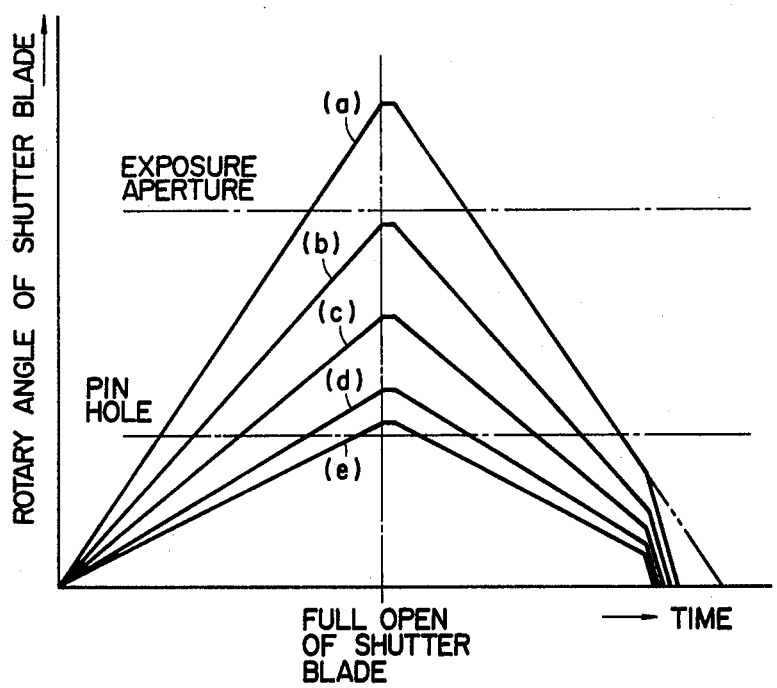
FIG. 6 is a diagram showing opening and closing characteristics of blades of a program shutter according to the present invention.

As described above, according to the present invention, a flash-photographing can be made at all shutter speeds. FIG. 6 shows opening characteristics of a program shutter according to the present invention. Symbol (a) shows a characteristic curve of the blade opening and closing operation in the case of a low speed with a large diaphragm aperture. Symbol (b) shows a characteristic curve of the blade opening and closing operation in the case of a high speed with a small diaphragm aperture. As clear from the diagram, even if the proper EV value is different, the fully opened time of the shutter blades will be always constant and, if the time point of the maximum brightness of the flash light is synchronized with this fully opened time, a favourable flash-photographing will be able to be made.

According to the above described embodiment, the operating surface 42b of the holding lever 42 is formed as a smooth arcuate surface. However, this operating surface can be serrated as shown in FIG. 5. Further, the holding lever 42 itself may be made of a plastic or hard rubber. If the holding lever 42 is thus formed, the EV-lever 13 will be held more positively and will be able to well perform its role even in case a comparatively weak spring 43 is used.

Figure 7:
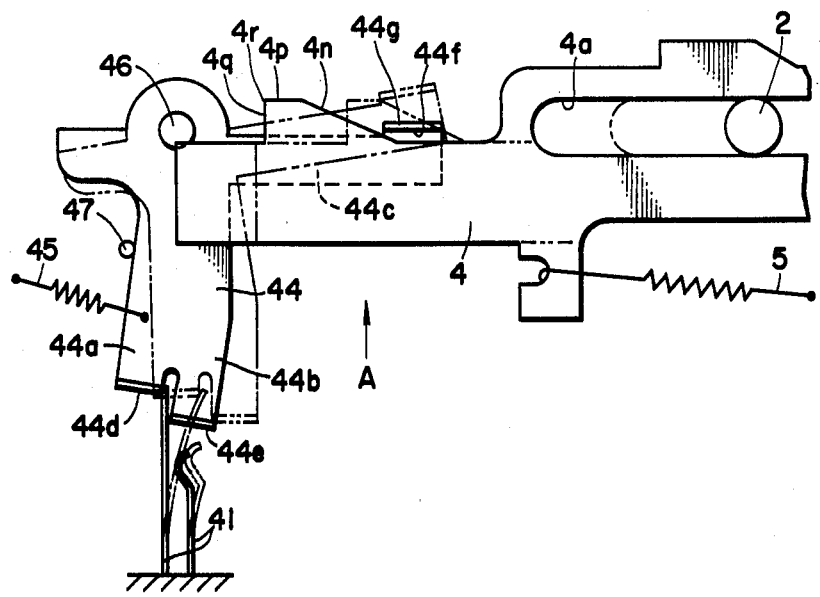
FIG. 7 is a plan view showing another embodiment of a synchroswitch mechanism.

An embodiment different from the X-synchrocontact mechanism shown in FIG. 1 is shown in FIG. 7. That is to say, according to this embodiment, cam surfaces 4n, 4p and 4q are formed instead of the projection 4i in the left end portion of the driving plate 4. Reference numeral 44 indicates a rocking lever forming forked arms 44a and 44b and an arm 44c of a resilient material supported rotatably by a shaft 46 erected on the base plate 1 and biased clockwise by a tension spring 45 but stopped by a stopper 47. Bends 44d, 44e and 44f are formed respectively on the arms 44a, 44b and 44c. Particularly, the upper surface of the bend 44 is made a slope 44g as shown in FIG. 7A. Synchroswitch contact pieces 41 are controlled by the sides of the bend 44e of the arm 44b so as not to contact each other. The relation of the heights of the driving plate 4 and rocking lever 44 is as shown in FIG. 7A.

The operation shall be explained in the following. As already described, when the driving plate 4 begins to operate rightward, the bend 44f will contact the cam surface 4n and the rocking lever 44 will gradually rotate counterclockwise against the tension of the tension spring 45. By this counterclockwise rotation, the longer one of the switch contact pieces 41 will be pushed by the bend 44d of the arm 44a so as to begin to gradually curve rightward. When the bend 44f nearly reaches the corner of the cam surfaces 4n and 4p (shown by the two-point chain lines in FIG. 7B), the synchroswitch contact pieces 41 will contact each other to light a flash. When the driving plate 4 further shifts rightward, the side 4p will shift to the state shown in FIG. 7B from the state shown by the two-point chain lines in FIG. 7. Meanwhile, the rocking lever 44 will be controlled by the side 4p, will not therefore rotate and will remain at a stop. That is to say, the switch mechanism remains "ON" state. At this time, the shutter blades will be opened. When the driving plate 4 is further shifted rightward, the corner 4r will also shifted rightward and the rocking lever 44 will be rotatable clockwise. Therefore, the rocking lever 44 will gradually rotate clockwise and the contact pieces 41 will begin to return. When the driving plate 4 further shifts rightward, the rocking lever 44 will be completely released from the control, will quickly rotate clockwise and will stop in contact with the stopper 47 (as shown by the two-point chain lines in FIG. 7B). On the other hand, the longer one of the switch contact pieces 41 will be inclined leftward by the bend 44e so as to be returned to the original position and therefore the switch mechanism 41 will be off. Further, the driving plate 4 will operate rightward to begin to close the shutter blades, the shaft 2 will stop in contact with the left end of the guide slot 4a and the shutter blades will be fully closed to complete one photographing.

When the driving plate 4 is then returned leftward to cock the shutter, the surface 4q will push the slope 44g of the rocking lever 44 so that the arm portion 44c will flex as shown by the two-point chain lines in FIG. 7C and the driving plate 4 will be able to shift leftward to return to the set state in FIG. 7.

By the way, in this embodiment, only the arm 44c of the rocking lever 44 has been explained as of a resilient material but is not to be limited to be of it and the bends 44d and 44e may be particularly eliminated. Further, even in case the upper and lower relations of the rocking lever 44 and driving plate 4 are reversed, the device will be able to be worked in the same manner. In such case, the rocking lever 44 will be electrically insulated from other parts.

According to the embodiments shown in FIGS. 7 to 7C, both synchrocontact pieces 41 will not be fused by the spark generated when they contact each other and the switch 41 will be forcibly opened and closed by the rocking lever 44 and will not mis-operate. Thus a flash-photographing can be carried out positively.

In the above explained respective embodiments, the case of using an X-synchrocontact in the flash-photographing has been explained but it is also possible to use an M-synchrocontact and to fit both X- and M-synchrocontacts. In the latter case, a change-over switch may be provided. The cam surfaces 4e, 4f and 4g formed on the driving plate 4 and parallel respectively with the cam surfaces 27a, 27b and 27c of the clutch pawl lever 27 have not been particularly explained but are to make the cam surfaces 27a, 27b and 27c accurately follow the movement of the pin 11 and are not particularly necessary. The projection 4i is covered with an electrically insulating material. The EE mechanism also is not limited to the above described embodiment and, needless to say, can be formed, for example, as of a type of rotating the EV-lever 13 as operatively connected directly with a rotary coil of an exposure meter.

In the already explained embodiment, the driving member 4 is formed as a linearly moving plate member but can be formed as a rotary disk member as shown in FIG. 8. In the embodiment in FIG. 8, the EE mechanism is more simplified and the EV-lever 13 in FIG. 1 is substantially omitted. In the following, on this embodiment, the same parts or portions as in FIG. 1 are indicated respectively by the same reference numerals as are used in FIG. 1 with dashes attached to them. In FIG. 8, reference numeral 4' indicates a driving cam plate forming cam portions 4j' and 41' and a locking portion 4c', supported rotatably by a shaft 48 and biased clockwise by a driving source not illustrated but controlled by having the locking portion 4c' locked by a later described locking member 6'. Reference numeral 18' indicates a release member forming a slope 18c' and stopper pin 18d'. The locking member 6' is biased rightward by a tension spring 8' but is controlled by a release member 18'. Reference numeral 49 indicates a connecting link serving to transmit the operation of the driving cam 4' to an intermediate lever member 9'. Reference numeral 42' indicates a holding lever forming a tooth-shaped portion 42b' and tip 42a', supported rotatably by a shaft 2' and biased clockwise by a tension spring 43' but controlled by the tip 42a' in contact with the surface 4j' of the cam plate 4'.

The operation shall be explained in the following. When the release member 18' is first pushed down, by its initial operation, the comb tooth-shaped lever 25' will be rotated clockwise to set the leverage of the intermediate lever 9' with a shifting center pin 17'. When the release member 18' is further pushed down, the locking member 6' will shift rightward to be pulled out of the locking portion 4c' so as to unlock it.

By this operation, the driving cam 4' will begin to slowly rotate clockwise by a governor mechanism not illustrated. Then, the tip 42a' of the holding lever 42' will be pushed by the cam portion 4j' of the cam plate 4' to rotate the holding lever 42' counterclockwise, to bring the tip 25b' of the comb tooth-shaped lever 25' already in the rotating range and the tooth-shaped portion 42b' into contact with each other and to fix the comb tooth-shaped lever 25'. This fixed state will be maintained while the tip 42a' is on the cam portion 41' of the cam plate 4'. On the other hand, when the driving cam 4' rotates clockwise, the intermediate lever 9' will rock with the pin 17' as a center through a link 49 to open and close shutter blade 36'.

In this embodiment, the comb tooth-shaped lever 25' directly varies the leverage but it is needless to say that it is also possible to utilize for it such EV-lever as is shown in the embodiment in FIG. 1. It is also possible to incorporate the already explained flashmatic mechanism.

In a camera of a type in which, unless the film is wound up, the shutter can not be released, it is not necessary to begin the fixing by the holding lever at the time when the shutter blades are opened and to release the fixing by the holding lever before the shutter is cocked after the blades are closed. Even if the shutter blades are closed, unless the shutter is cocked, it will be possible to continue the fixed state.

We claim:

1. A shutter for cameras comprising: shutter blades which are also diaphragm blades; a driving member movable between cocked and uncocked positions and capable of moving at a constant speed upon release of the shutter; an intermediate lever member operatively connected with said driving member and with said shutter blades, said intermediate lever member having a shiftable pivot thereon for determining the operated amount of said shutter blades; a clutch pawl lever member pivoted on said driving member and engaged with said intermediate lever member; and a judging lever member pivoted on said driving member and engageable with said clutch pawl lever member whereby said intermediate lever member is reciprocated to open and close said shutter blades by said clutch pawl lever member being locked by said judging lever member when said driving member is moved from its cocked position to its uncocked position following shutter release, said judging lever member being disengaged from said clutch pawl member so that said intermediate lever member may be held in an immovable state when said driving member is moved from its uncocked position to its cocked position.

2. A shutter for cameras according to claim 1 wherein said shutter further comprises an EE mechanism, whereby the pivot of said intermediate lever member is shifted by said EE mechanism.

3. A shutter for cameras according to claim 1 wherein said shutter further comprises a flashmatic mechanism, whereby the pivot of said intermediate lever member is shifted by said flashmatic mechanism.

4. A shutter for cameras according to claim 1 wherein said shutter further comprises an EE mechanism and flashmatic mechanism, whereby the pivot of said intermediate lever member is shifted by said EE mechanism and flashmatic mechanism.

5. A shutter for cameras according to claim 1 wherein said shutter further comprises a holding lever member engaged with said driving member, whereby the pivot of said intermediate lever member may be held in an immovable state by said holding lever members when said pivot is shifted by the shutter release.

6. A shutter for cameras according to claim 5 wherein the operating surface of said holding lever members is serrated.

7. A shutter for cameras according to claim 5 wherein said holding lever member is made of such elastic material as a hard rubber.

8. A shutter for cameras according to claim 1 wherein said shutter further comprises a rocking lever member engaged with said driving member, and a synchroswitch operatively connected with said rocking lever member, whereby said rocking lever member may be rocked by said driving member so that said synchroswitch is operated when said driving member is shifted from its cocked position to its uncocked position.

9. A shutter for cameras according to claim 8 wherein said rocking lever member is made of a resilient material.

* * * * *